United States Patent [19]

Jaques et al.

[11] Patent Number: 5,554,352
[45] Date of Patent: Sep. 10, 1996

[54] PROCESSED SILICA AS A NATURAL POZZOLAN FOR USE AS A CEMENTITIOUS COMPONENT IN CONCRETE AND CONCRETE PRODUCTS

[75] Inventors: Stephen B. Jaques, West Des Moines, Iowa; Richard D. Stehly, Minneapolis; Peter B. Dunning, St. Paul, both of Minn.

[73] Assignee: Construction Material Resources, West Des Moines, Iowa

[21] Appl. No.: 438,181

[22] Filed: May 9, 1995

[51] Int. Cl.⁶ .................... C01B 33/18; C04B 22/06; C04B 14/04
[52] U.S. Cl. ............... 423/339; 423/327.1; 423/335; 106/737
[58] Field of Search ............... 106/737; 423/339, 423/335, 327.1

[56] References Cited

U.S. PATENT DOCUMENTS

| | | | |
|---|---|---|---|
| 382,505 | 5/1888 | Bayer | 423/124 |
| 1,251,057 | 12/1917 | Langford | 423/339 |
| 2,879,136 | 3/1959 | Maloney | 423/339 |
| 3,172,727 | 3/1965 | Burke, Jr. et al. | 423/339 |
| 3,311,449 | 3/1967 | Atsukawa et al. | 423/339 |
| 3,338,667 | 8/1967 | Pundsack | 423/339 |
| 3,890,426 | 6/1975 | Stevens et al. | 423/339 |
| 3,973,978 | 8/1976 | Nakagawa et al. | 106/694 |
| 3,985,567 | 10/1976 | Iwu | 423/111 |
| 4,070,260 | 1/1978 | Dreulle | 423/339 |
| 4,124,405 | 11/1978 | Quienot | 106/697 |
| 4,237,102 | 12/1980 | Cohen et al. | 423/126 |
| 4,241,030 | 12/1980 | Cohen et al. | 423/126 |
| 4,255,195 | 3/1981 | Holter et al. | 106/737 |
| 4,306,912 | 12/1981 | Forss | 106/707 |
| 4,432,666 | 2/1984 | Frey et al. | 106/640 |
| 4,526,763 | 7/1985 | Bartlett et al. | 423/112 |
| 4,634,581 | 1/1987 | Cambridge et al. | 423/126 |
| 5,165,907 | 11/1992 | Chieng | 423/339 |
| 5,176,752 | 1/1993 | Scheiner | 106/737 |
| 5,250,113 | 10/1993 | Berke et al. | 106/737 |
| 5,256,197 | 10/1993 | Smith | 106/708 |
| 5,266,397 | 11/1993 | Ogawa et al. | 428/323 |
| 5,304,709 | 4/1994 | Babcock et al. | 106/697 |
| 5,352,288 | 10/1994 | Mallow | 106/605 |
| 5,356,671 | 10/1994 | Drs | 106/724 |
| 5,366,548 | 11/1994 | Riddle | 106/705 |
| 5,383,967 | 1/1995 | Chase | 106/737 |
| 5,445,804 | 8/1995 | Iosef | 423/339 |

FOREIGN PATENT DOCUMENTS

| | | | |
|---|---|---|---|
| 155059 | 5/1982 | Germany | 106/737 |
| 53-017631 | 2/1978 | Japan | 106/737 |
| 57-0095858 | 6/1982 | Japan . | |
| 61-097151 | 5/1986 | Japan | 106/737 |
| 1204595 | 1/1986 | U.S.S.R. . | |
| 2131409 | 6/1984 | United Kingdom | 106/737 |

Primary Examiner—Anthony Green
Attorney, Agent, or Firm—Zarley, McKee, Thomte, Voorhees, & Sease

[57] ABSTRACT

A pozzolan for use in concrete products which is a silica by-product in the acid treatment of silica-containing ore is described. The pozzolan contains over 75% by weight amorphous silica and provides an increase in the early strength of concrete in comparison to traditional pozzolans as well as minimizing alkali-silica reactions due to the presence of less impurities.

14 Claims, No Drawings

PROCESSED SILICA AS A NATURAL POZZOLAN FOR USE AS A CEMENTITIOUS COMPONENT IN CONCRETE AND CONCRETE PRODUCTS

FIELD OF THE INVENTION

The present invention relates to additives to concrete products, in particular, a pozzolan produced from acid digestion of a silica-rich ore.

BACKGROUND OF THE INVENTION

Concrete is a prehistoric building material which is one of the oldest used by mankind for construction purposes. Recent research indicates that concrete originated in the New Stone Age, around 7000 B.C. (Malinowski, et al., "Prehistory of Concrete," Concrete International, V. 13, No. 3, Mar. 1991, pp. 62–68). Since ancient times, mankind has searched for ways to improve the properties of concrete.

As early as 1600 B.C., man realized the benefits to using natural pozzolans in conjunction with building materials. The Greeks discovered pozzolan-lime mixtures sometime between 700 and 600 B.C., and later passed their use in concrete along to the Romans about 150 B.C. Early pozzolans consisted primarily of volcanic ash.

Generally, a pozzolan is defined as "a siliceous or siliceous and aluminous material which in itself has little or no cementitious value but will in finely divided form and in the presence of moisture chemically react with calcium hydroxide at ordinary temperatures to form compounds possessing cementitious properties" (American Concrete Institute definition 116R). Slag and fly ash, a product of the combustion of powdered coal, are commonly used pozzolans.

A natural pozzolan is either a raw or calcined natural material that has pozzolanic properties. Id. Some natural pozzolans include volcanic ashes, pumicites, opaline cherts and shales, tuffs, and some diatomaceous earths.

The properties of natural pozzolans vary considerably, depending on their origin. This is caused by the variable proportions of the active materials and their mineralogical and physical characteristics. Most natural pozzolans contain substantial amounts of constituents other than silica, such as alumina and iron oxide, and alkalis, which will also react with calcium hydroxide and alkalis (sodium and potassium) to form more complex compounds.

The molecular structure as well as the amount of silica present in pozzolans is also very important. Generally, amorphous silica reacts with calcium hydroxide and alkalis more rapidly than does silica in the crystalline form (quartz, for example) (ACI Committee 232, 1994, "Proposed Report: Use of Natural Pozzolans in Concrete", ACI Materials Journal, V. 91, No. 4, p. 412).

When a mixture of portland cement and a pozzolan reacts, the pozzolanic reaction progresses like an acid-base reaction of lime and alkalis with oxides ($SiO_2+Al_2O_3+Se_2O_3$) of the pozzolan. Two things happen: first, there is a gradual decrease in the amount of free calcium hydroxide with time, and second, there is an increasing formation of CSH and calcium aluminosilicates that are similar to the products of hydration of portland cement. The partial replacement of portland cement by pozzolan has been found to increase the resistance of concrete to sulfate and seawater attack which is in part attributable to the removal of free calcium hydroxide formed in the hydration of portland cement by combination with the pozzolan. The end result will be that the concrete mixture will contain less calcium hydroxide and more CSH and other products of low porosity.

The shape, fineness, particle size distribution, density, and composition of natural pozzolan particles influence the properties of freshly mixed and hardened concrete, and the strength development of hardened concrete. Most natural pozzolans tend to increase the water requirement of the concrete product as a result of their microporous character and high surface area. When properly employed as an ingredient of portland-pozzolan cement or as admixtures to portland-cement concrete, pozzolans can improve the performance of both fresh and hardened concrete.

There are several advantages to combining pozzolans with concrete. Firstly, concrete containing a pozzolan typically has lower permeability. Secondly, pozzolans have been used in mass concrete of low cement content to reduce the temperature rise of concrete as compared to a comparable concrete mixture containing portland cement as the only cementing material. The slower rate of heat development with pozzolans permits more economic removal of heat than with comparable non-pozzolan concrete.

Thirdly, it has been reported that almost any pozzolan, when used in sufficient quantity, is capable of preventing excessive expansion resulting from alkali-silica reaction. The alkali-silica reaction involves the interaction of hydroxyl ions associated with alkalis in portland cement with certain siliceous constituents of the aggregates in concrete. Products of the reaction can cause excessive expansion, cracking, and general deterioration of the concrete. Investigators have observed that natural pozzolans are usually more effective than fly ash in controlling the alkali-silica reaction (Pepper, L., and Mather, B., 1959, "Effectiveness of Mineral Admixtures in Preventing Excessive Expansion of Concrete Due to Alkali-Aggregate Reaction," ASTM 59, pp. 1178–1203).

When pozzolanic materials are used to replace cement on an equal volume basis, early strengths may be reduced. However, these early strengths can be increased by substituting the pozzolanic material for the cement on an equal mass basis or a volumetric amount greater than one to one for the cement replaced, provided water content is not increased excessively. The contribution of the pozzolanic strength development occurs sometime after seven days of hydration (Mehta, "Natural Pozzolans", Supplementary Cementing Materials for Concrete, 1987).

Use of natural pozzolans with portland cement in concrete generally increases its resistance to aggressive attack by seawater, sulfate-bearing soil solutions, and natural acid waters. The relative improvement is greater for concrete with low cement content. In one study, it was found that blended cements manufactured using highly siliceous natural or artificial pozzolan, slags, or silica fume perform better in sulfate environments than ordinary portland cement (Patzias, T., 1987, "Evaluation of Sulfate Resistance of Hydraulic Cement Mortars by the ASTM C1012 Test Method," Concrete Durability: Katherine and Bryant Mather International Conference, SP 100, American Concrete Institute, Detroit, pp. 2103–2120).

As a practical matter, the use of natural pozzolans can provide a major economic benefit in that the use of these materials permits a reduction in the amount of portland cement in the mixture. Other technical benefits in the use of pozzolans have not been spectacular, however. While the use of pozzolans often provides higher strengths for concrete at later ages, their early strength is deficient in contrast to pure portland cement. Further, natural pozzolans often contain many impurities which decrease their resistance to sulfates and discolor the concrete.

It is therefore a primary objective of the present invention to provide an improved pozzolan which when combined with concrete products increases early strength of the concrete-pozzolan product.

Another primary object of the present invention is to provide an improved pozzolan with good sulfate resistance when combined with concrete products.

It is yet another objective of the present invention to provide an improved pozzolan which is safe and economical to use.

SUMMARY OF THE INVENTION

An improved pozzolan is provided which is a silica by-product resulting from acid treatment of silica rich ore. The resulting processed silica is much more pure than traditional natural pozzolans including slag and fly ash. Further, the improved pozzolan is over 75% amorphous silica which allows for up to 30% higher strength faster than other pozzolans in addition to being safer to work with than crystalline silica. Additionally, the processed silica of the present invention minimizes alkali reactive conditions thus minimizing secondary reactions associated with traditional portland cement.

DETAILED DESCRIPTION OF THE INVENTION

The focus of this application is on the preparation and use of an extremely pure silica pozzolan which provides many benefits over traditional pozzolans, including fly ash and slag. The pozzolan is a by-product of acid treatment of silica-rich ore.

As previously stated, pozzolans containing silica have been known for many years. Traditional pozzolans, such as fly ash which typically contain 40–50% silica, have little early strength and contain impurities which increase the concrete's susceptibility to being attacked by sulfates. In contrast, the pozzolan of the present invention typically contains over 85% silica and less impurities, thereby decreasing the concrete's reactivity to sulfates. Further, the improved pozzolan contains amorphous silica which is more reactive with concrete than crystalline silica. The resulting concrete product has increased early strength over that of traditional pozzolanic concrete products. Amorphous silica is also safer to work with in that it does not cause respiratory problems when inhaled as does crystalline silica.

The Bayer Process is a process for the recovery of alumina from silica ore. During the Bayer Process, a silica-containing ore is digested with an acid to form alum along with a silica waste by-product. This silica slurry is discarded as waste product. Applicants have discovered that this waste product functions as a natural pozzolan and, quite unexpectedly, gives 30% increased strength and faster curing time than all known pozzolans to date.

In using the process of the present invention, the liquid is decanted and filtered from the silica product. The silica product is washed then impounded for dewatering, drying, and grinding. Normally, this silica product is discarded as waste. Applicants discovered, however, that this silica "waste" product, containing over 85% amorphous silica, could be dehydrated, ground, and used as an improved pozzolan in concrete. This "waste" product was found to not only offer many advantages over traditional pozzolans, but provided a way to make use of a silica product which is normally thrown away.

Since the pozzolan of the present invention comprises amorphous silica, it is extremely safe to use. Contact with amorphous silica dust by inhalation, skin, oral or dermal route does not cause adverse effects in contrast to crystalline silica. Further, amorphous silica does not cause the lung diseases crystalline silica is known to cause.

The general process for obtaining the natural pozzolan of the present invention is as follows: a silica-containing ore is treated with a strong acid which "digests" the ore to produce an insoluble acid product which is precipitated after the settling of the digester slurry. This insoluble product is washed and the "wash" water is used for all water requirements during the ore substitute digestion and subsequent washings. The digester silica-containing slurry is allowed to sit for a period of time and afterward the liquid formed upon settling is decanted from the solid silica product. The silica product is then washed and later dewatered. The processed silica can then be ground for use as a pozzolan.

Any silica-rich ore which yields amorphous silica upon treatment with an acid is appropriate for use in the present invention, including but not limited to bauxite, kaolin, and mullite. Bauxite is the preferred ore. These silica-rich ores will not react with lime if left untreated. In accordance with Applicants' invention, the ore is treated with an acid to form a product which is highly reactive with lime, thus giving it pozzolanic properties.

In the acid treatment step, any strong acid capable of dissolving and digesting the silica ore is appropriate. However, sulfur must be present during the reaction in order to produce the final pozzolan product. Therefore, the preferred acid for treatment is sulfuric acid. If sulfuric acid is not used, the invention requires the addition of sulfur from another source.

The reaction temperature during acid treatment of the silica ore is from 150°–450° F. The acid digestion of the ore should occur for 24–48 hours or until the ore is sufficiently dissolved and digested. The digested product is then allowed to cool to precipitate out the silica product.

Silica is the key ingredient necessary to provide ideal strength and reactivity properties to the pozzolan product of the present invention. The range of silica in Applicants pozzolan is between 75–95% by weight. Preferably, the pozzolan contains over 85% silica and most preferably 92–93% silica. Titanium oxide can also be included in order to impart a whiter color to the concrete or concrete product. At least ½% titanium oxide is necessary to whiten the product and the preferred range is ½–3 % by weight.

A detailed example of pozzolan production is provided below. This example is not meant to limit the invention in any way but merely provides one example of how the pozzolan in the present invention can be obtained.

EXAMPLE

Natural pozzolan grade N is made from ores rich in silica (example-bauxite ore substitute, sulfuric acid and water.) First, bauxite is received in rail cars containing approximately 100 tons of ore (typical analysis-49% $Al_2O_3$.)

Secondly, 93% sulfuric acid is pumped from tank trucks into on-site storage tanks for later usage and is used to digest the silica ore. Besides silica, alumina is the other major constituent of the pozzolan product and also contributes to the overall strength and reactivity properties of the pozzolan.

Thirdly, washwater, a dilute solution of alum is obtained from the washing of the insoluble material remaining after the settling of the digester slurry. This "washwater" is used for all water requirements during the bauxite ore substitute digestion and subsequent washings.

Nextly, sulfuric acid (66 degrees Baume or 93%) equivalent to approximately 77,000 pounds of 100% acid is charged to the digester which already contained 2,500 gallons of 6–8 degrees Baume washwater. The concentration of the acid is adjusted to 35.5° Baume at 250° F. by adding additional washwater if needed. Bauxite equivalent to approximately 27,000 pounds of equivalent $Al_2O_3$ is added over a period of 3 hours. When the reaction is complete, washwater is added for dilution until 37.0° Baume is obtained.

The digester slurry is then pumped into a settling tank where it is held for 12 hours. All the clear liquid is decanted, filtered, and sent to storage tanks.

The silica in the settling tank is washed 4 times. Impound and fresh water enters the system when the silica receives its final wash. After the final washing, the silica is then washed to the impound for dewatering, drying, grinding, and storage for shipping. The water is reclaimed for use.

A pozzolan ("Pozzament") prepared in accordance with the present invention was evaluated by American Engineering Testing, Inc. and its performance in concrete compared to fly ash and microsilica. The scope of the testing consisted of laboratory batching concrete and making concrete masonry units at a commercial block plant. Tests of the pozzolan of the invention, concrete, and concrete masonry units were included. The composition of the materials tested was as follows:

| CONSTITUENT | POZZAMENT | FLY ASH[1] | MICROSILICA[2] |
|---|---|---|---|
| Silica, $Si_2O_3$ | 89.0% | 25–60% | 92–98% |
| Alumina, $Al_2O_2$ | 9.2% | 10–30% | 0.5% |
| Iron Oxide, $Fe_2O_3$ | 0.4% | 5–25% | 2.1% |
| Magnesium Oxide | 0.02% | <5% | 0.3% |
| Calcium Oxide | 0.02% | 1–30% | 0.8% |
| Sodium Oxide | <0.01% | <5% | 0.1% |
| Potassium Oxide | 0.12% | <5% | 1.0% |
| Sulfur Trioxide | 1.5% | <6% | 0.25% |
| Titanium Dioxide | 1.7% | — | — |

[1]American Concrete Institute's Committee 226 Report "Use of Fly Ash in Concrete".
[2]WR Grace's Engineering Bulletin on Force 10,000 Microsilica

TEST METHODS AND RESULTS

Superior Minerals processed 25 tons of Pozzament for testing. A 1 cubic yard sack of the material was delivered for testing. The Pozzament of the invention was used to batch about 500 concrete blocks and 4 loads of concrete.

The concrete masonry units were made at a commercial block plant using a low pressure steam curing system. The 8"×8"×16" hollow core block were made using a Besser V-3-12 block machine. Three batches were run using 30%, 40%, and 50% Pozzament. The following proportions were used:

|  | 1 | 2 | 3 | CONTROL |
|---|---|---|---|---|
| Portland Cement | 70% | 60% | 50% | 70% |
| Pozzament | 30% | 40% | 50% | None |
| Fly Ash | None | None | None | 30% |
| Sand/Cementitious Ratio | 7.7 | 7.7 | 7.7 | 7.7 |

Block from each run was sampled and delivered to the laboratory for testing. Samples from the typical mix were also obtained for comparison.

The blocks were tested for conformance to ASTM:C90 "Standard Specification for Load-Bearing Concrete Masonry Units". The compressive strength, absorption, moisture content, density, and dimensions were determined following ASTM:C140 methods. Shrinkage testing is currently underway. Data sheets are attached continuing the test data.

All the Pozzament concrete blocks met ASTM:C90 requirements. The following is a summary of the data:

|  | 1 | 2 | 3 | CONTROL |
|---|---|---|---|---|
| Block Weight, received, lbs | 36.7 | 37.0 | 37.5 | 37.1 |
| Density, pcf | 136.3 | 136.6 | 138.1 | 136.4 |
| Absorption, % | 6.0 | 6.5 | 6.4 | 5.5 |
| Moisture Content, % of absorption | 43 | 50 | 50 | 27 |
| Compressive strength, psi |  |  |  |  |
| 7-day | 2,600 | 2,050 | 1,290 | 2,050 |
| 28-day | 3,330 | 2,650 | 2,640 | 2,900 |

Four laboratory batches of Pozzament concrete were prepared in a 3 cubic foot mixer. The concrete was batched using MnDOT 3A41 proportions and a control concrete used for comparison. The following proportions were used:

|  | 1 | 2 | 3 | 4 | CONTROL |
|---|---|---|---|---|---|
| Portland Cement, pcy | 531 | 472 | 413 | 354 | 501 |
| Pozzament, pcy | 59 | 118 | 177 | 236 | None |
| Fly ash, pcy | None | None | None | None | 89 |
| Gravel, pcy | 1,730 | 1,730 | 1,730 | 1,730 | 1,730 |
| Sand, pcy | 1,230 | 1,230 | 1,230 | 1,230 | 1,230 |
| Air Entrainment, pcy | 5 | 5 | 5 | 5 | 5 |

Water was added to achieve a slump of 2½–4". Also, the air entrainment was adjusted to create 4.5% to 5.5% air content. The plastic concrete was tested for slump, air content, unit weight, temperature and set time. Compressive strength cylinders were cast from the batches.

The Pozzament reduced the set time of the concrete by 1 to 2 hours. The Pozzament water demand was greater than the control and increased with higher Pozzament use. The early age compressive strength is improved. However, strength at 28 days decrease with increase in Pozzament. The following is a summary of the data:

|  | 1 | 2 | 3 | 4 | CONTROL |
|---|---|---|---|---|---|
| W/cm | 0.44 | 0.46 | 0.47 | 0.50 | 0.42 |
| Slump, in. | 3½ | 3½ | 2¾ | 2¼ | 3¾ |
| Air Content | 4.5 | 5.5 | 4.5 | 5.5 | 4.5 |

-continued

|  | 1 | 2 | 3 | 4 | CONTROL |
|---|---|---|---|---|---|
| Temp (°F.) | 58.6 | 61.7 | 59.0 | 58.0 | 65.0 |
| Unit Weight, pcf | 145.2 | 143.0 | 145.2 | 142.9 | 145.5 |
| Set |  |  |  |  |  |
| Initial, hr, mn | 3:35 | 3:50 | 3:30 | 4:10 | 5:20 |
| Final, hr, mn | 4:30 | 5:20 | 5:00 | 5:50 | 6:40 |
| Compressive Strength, psi |  |  |  |  |  |
| 3-day | 3,810 | 3,450 | 1,830 | 1,700 | 2,820 |
| 7-day | 4,860 | 4,090 | 3,010 | 2,860 | 5,090 |
| 28-day | 5,720 | 4,900 | 3,870 | 3,560 | 6,180 |
| 56-day | 5,980 | 4,960 | 4,100 | 3,860 | — |

Based on the above-stated results, the following conclusions were deemed appropriate by American Engineering Testing, Inc.:

Pozzament meets the requirements of ASTM:C618 for a Type N (raw or calcined natural) pozzolan. It is suitable for use in portland cement concrete and concrete masonry products.

Pozzament concrete masonry units are 27% and 15% stronger then typical block at 7 and 28 days, respectively.

Pozzament addition rates of up to 50% of the cementitious component yield block meeting ASTM:C90 requirements.

The Pozzament concrete block has low efflorescence potential and is lighter in color. The reduction in efflorescence potential developed from two factors. Pozzament contains little alkalis which are often leached from concrete block and form a stain. Also, the additional cementation consumes lime which can contribute to efflorescence.

Pozzament concrete is comparable to MnDOT paving concrete at low addition rates (10% of the cementitious material). The compressive strength at early ages is increased as much as 35% but lags as much as 40% at 28 days at high dosages (40% of total cementitious material). The set time of the concrete is reduced 1 to 2 hours.

The performance of Pozzament is probably due to physical factors. The particle shape of Pozzament is angular due to crushing. Fly ash, however, is spherical. As a result, fly ash use reduces water demand for a given slump of concrete where Pozzament increases water demand. The water cementitious ratio of Pozzament concrete increased from 0.44 at 10% use to 0.50 at 40%. As expected, the compressive strength at 28 days dropped from 5720 psi to 3560 psi as a result.

The difference in set time of the Pozzament concrete is due to the reactive nature of the amorphous silica. It is well known that fly ash will retard the set of concrete. Often accelerators are used to compensate for this undesirable feature. However, the high quantity of reactive silica present in Pozzament drives the cementation reaction more quickly. The behavior is similar to concrete containing microsilica.

Based on the conclusions reached by American Engineering Testing, Inc., it can be appreciated that the pozzolan of the present invention performs superior in many respects in comparison to fly ash and microsilica. The use of Pozzament in concrete resulted in early compressive strength, a decrease in the set time of the concrete, a lowering of the efflorescence potential, and improved color. Pozzament did not have as high of compressive strength over time when used in high dosages but was comparable to MnDOT paving concrete when using lower dosages.

It is therefore seen that the present invention accomplishes at least all of its objectives.

What is claimed is:

1. A method of making a natural pozzolan comprising:
    digesting bauxite ore with sulfuric acid to obtain a silica slurry;
    allowing the silica slurry to settle to produce a silica product and liquid;
    decanting the liquid from the silica product;
    washing the silica product at least one time;
    drying and thereafter grinding the silica product wherein said silica product comprises from about 75% to 95% by weight of amorphous silica and acts as a natural pozzolan.

2. A method of making a natural pozzolan according to claim 1 wherein the silica product comprises at least 85% by weight of silica.

3. A method of making a natural pozzolan according to claim 2 wherein the silica product contains 92–93% by weight of silica.

4. A method of making a natural pozzolan according to claim 1 wherein the silica product is washed four times.

5. A method of making a natural pozzolan according to claim 1 wherein the silica product further comprises no more than 25% by weight alumina.

6. A method according to claim 1 wherein the sulfuric acid is present in a concentration of about 93%.

7. A method according to claim 2 wherein the silica product comprises no more than 15% by weight alumina.

8. A method according to claim 3 wherein the silica product comprises no more than 8% by weight alumina.

9. A concrete product comprising:
    from about 50% to about 70% by weight Portland cement; and
    from about 30 to about 50% by weight of a natural pozzolan containing at least 90% by weight processed amorphous silica and no more than 10% by weight alumina, wherein the natural pozzolan is a by-product obtained from sulfuric acid treatment of bauxite ore in a process comprising the steps of:
    a) digesting bauxite ore with sulfuric acid to obtain a silica slurry;
    b) allowing the silica slurry to settle to produce a silica product and liquid;
    c) decanting the liquid from the silica product;
    d) washing the silica product at least one time;
    e) drying and thereafter grinding the silica product.

10. An improved concrete product according to claim 9 wherein the pozzolan contains 92–93% by weight amorphous silica.

11. A method of making a natural pozzolan comprising:
    digesting bauxite ore with about 93% sulfuric acid to obtain a silica and alumina-containing slurry;
    allowing the slurry to settle to produce a silica/alumina product and liquid;
    decanting the liquid from the silica/alumina product;
    washing the silica/alumina product at least one time; and
    drying and thereafter grinding the silica/alumina product.

12. A method according to claim 11 wherein the silica/alumina product contains at least 90% by weight silica and no more than 10% by weight alumina.

13. A method making a natural pozzolan consisting essentially of:
    digesting bauxite ore with sulfuric acid to obtain a silica slurry;
    allowing the silica slurry to settle to produce a silica product and liquid;
    decanting the liquid from the silica product;
    washing the silica product at least one time;

drying and thereafter grinding the silica product wherein said silica product comprises from about 75% to 95% by weight of amorphous silica and acts as a natural pozzolan.

14. A method according to claim 13 wherein the sulfuric acid is present in a concentration of about 93%.

* * * * *